US012731245B2

(12) United States Patent
Chacko et al.

(10) Patent No.: US 12,731,245 B2
(45) Date of Patent: Sep. 8, 2026

(54) METHOD AND SYSTEM OF PROVIDING ASSISTANCE DURING AN OPERATION PERFORMED ON AN EQUIPMENT

(71) Applicant: HCL Technologies Limited, New Delhi (IN)

(72) Inventors: Simy Chacko, Chennai (IN); Venkatesh Shankar, Chennai (IN); Jose Vincent, Chennai (IN); Yadav Pawan Jiyalal, Chennai (IN)

(73) Assignee: HCL Technologies Limited, New Delhi (IN)

( * ) Notice: Subject to any disclaimer, the term of this patent is extended or adjusted under 35 U.S.C. 154(b) by 352 days.

(21) Appl. No.: 18/377,845

(22) Filed: Oct. 9, 2023

(65) Prior Publication Data

US 2024/0135525 A1 Apr. 25, 2024
US 2024/0233113 A9 Jul. 11, 2024

(30) Foreign Application Priority Data

Oct. 20, 2022 (IN) ............................ 202211060088

(51) Int. Cl.
*G06T 7/00* (2017.01)
*G06T 7/50* (2017.01)
*G06V 20/70* (2022.01)

(52) U.S. Cl.
CPC ................ *G06T 7/001* (2013.01); *G06T 7/50* (2017.01); *G06V 20/70* (2022.01)

(58) Field of Classification Search
CPC ........... G06T 7/001; G06T 2207/10016; G06T 2207/30164; G06T 2207/30108; G06T 2207/30168; G06V 20/70
See application file for complete search history.

(56) References Cited

U.S. PATENT DOCUMENTS 7,180,014 B2 * 2/2007 Farber .................... G16H 40/20 606/1
9,830,511 B2 11/2017 Saptharishi et al.
(Continued)

FOREIGN PATENT DOCUMENTS

CN 111182291 B 5/2020
CN 112200777 A * 1/2021 ............ G06T 7/001
(Continued)

OTHER PUBLICATIONS

Patalas-Maliszewska J, Halikowski D. A Deep Learning-Based Model for the Automated Assessment of the Activity of a Single Worker. Sensors (Basel). Apr. 30, 2020;20(9):2571. doi: 10.3390/s20092571. PMID: 32366014; PMCID: PMC7248754. (Year: 2020).*
(Continued)

*Primary Examiner* — Michael Robert Cammarata
(74) *Attorney, Agent, or Firm* — Kendal M. Sheets

(57) ABSTRACT

A method and system of providing assistance during an operation performed on an equipment by a smart assistance device. A first set of image frames and a second set of image frames corresponding to forward steps and reverse steps respectively performed during the operation are received from an imaging device. Parts of the equipment are detected in each of first set of image frames and tagged. The smart assistance device detects parts of the equipment present in an image frame for each of the second set of the image frames. A discrepancy is determined in the reverse steps by comparing the parts of the equipment present in the frame of the second set of the image frames with the parts tagged in the corresponding first image frame of the first set of image frames. A notification and recommendation is provided to correct the discrepancy.

15 Claims, 3 Drawing Sheets

(56) References Cited

U.S. PATENT DOCUMENTS

| | | | | |
|---|---|---|---|---|
| 10,319,094 | B1 | 6/2019 | Chen et al. | |
| 2008/0237341 | A1* | 10/2008 | Fleck | G06K 7/10475 235/385 |
| 2013/0218783 | A1 | 8/2013 | Anand | |
| 2016/0371651 | A1* | 12/2016 | Page | G06Q 30/0631 |
| 2017/0300753 | A1* | 10/2017 | Billi | G06V 20/52 |
| 2018/0338801 | A1* | 11/2018 | Barnett | H04N 7/183 |
| 2020/0257791 | A1* | 8/2020 | Shannon | G06V 10/757 |
| 2020/0273575 | A1* | 8/2020 | Wolf | B25J 9/1661 |
| 2020/0273581 | A1* | 8/2020 | Wolf | G16H 40/63 |
| 2021/0006752 | A1* | 1/2021 | Garcia Kilroy | G06V 20/48 |
| 2021/0082564 | A1* | 3/2021 | Colachis | G16H 20/30 |
| 2021/0313052 | A1* | 10/2021 | Makrinich | G11B 27/28 |
| 2021/0391071 | A1* | 12/2021 | Moctezuma de la Barrera | G06T 7/70 |
| 2023/0054209 | A1* | 2/2023 | Roh | A61B 34/76 |
| 2025/0221786 | A1* | 7/2025 | Kumar | G16H 40/40 |

FOREIGN PATENT DOCUMENTS

| | | | | | |
|---|---|---|---|---|---|
| CN | 115019578 | A | * | 9/2022 | G09B 5/065 |
| JP | 2006155584 | A | * | 6/2006 | G06Q 10/06 |

OTHER PUBLICATIONS

Nwankpa, Chigozie, et al. "Achieving remanufacturing inspection using deep learning." Journal of Remanufacturing 11.2 (2021): 89-105. (Year: 2021).*

English translation of CN-112200777-A (Year: 2022).*

Vedang Dilipkumar Chauhan; Fault Detection and Classification in Automated Assembly Machines Using Machine Vision; Queen's University; Apr. 2016.

* cited by examiner

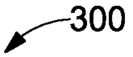

Receiving a first set of image frames corresponding to one or more forward steps performed during the operation and a second set of image frames corresponding to one or more reverse steps performed during the operation 302

For each of the first set of image frames, detecting one or more parts of the equipment (118) present in a first image frame 304

For each of the first set of image frames, tagging the first image frame with the one or more parts of the equipment 306

For each of the second set of image frames, detecting one or more parts of the equipment (118) present in a second image frame 308

Determining a discrepancy in the one or more reverse steps by comparing the one or more parts of the equipment present in the second image frame with the one or more parts tagged in one or more corresponding first image frame of the first set of image frames 310

Providing assistance by generating at least one of a notification with respect to the discrepancy or a recommendation for correcting the discrepancy 312

FIG. 3

METHOD AND SYSTEM OF PROVIDING ASSISTANCE DURING AN OPERATION PERFORMED ON AN EQUIPMENT

TECHNICAL FIELD

This disclosure relates generally to object detection, and more particularly to method and system for providing assistance during an operation performed on an equipment using object detection.

BACKGROUND

Today, with the rapid advancement and development in the smart of engineering and science, more inventions and technologies are being designed and developed with further advancements to the present technologies. The advancements in the technologies have further resulted in the leading technologies related to the various airplane systems, medical equipment, heavy mechanical and electrical machineries, vehicle systems, etc. to being more complex. The complex systems and technologies need special attention during the diagnostic operations including the servicing, repairing, maintenance, or overhauling, as even a small discrepancy in any of the operation could prove to be detrimental. Moreover, for performing the complex operations, skilled workforce is required, which can perform the operations efficiently without any error. But at times, even skilled workforce may make an error in performing the steps of an operation.

In order to track and perform diagnostic operations, a skilled workforce often is provided with checklists and manuals. However, the manuals and checklists only ensure that all the steps of the operations are performed, and that the operation is performed in a particular manner. However, it remains within the purview of the operator to adhere to the manuals and checklists. Accordingly, a workforce referring to the manuals and checklist, may skip or miss out on any step mentioned in the manual or checklist.

Therefore, checklists and manuals do not ensure an error free operation. There is, therefore, a need in the art to ensure error free operation performance.

SUMMARY OF THE INVENTION

In an embodiment, a method of providing assistance during an operation performed on an equipment is provided. A smart assistance device may perform the method to receive a first set of image frames corresponding to one or more forward steps performed during the operation and a second set of image frames corresponding to one or more reverse steps performed during the operation from one or more imaging device. In an embodiment, the one or more forward steps may have a one-on-one correspondence with the one or more reverse steps. The method may further include detection of one or more parts of the equipment present in a first image frame from the first set of image frames. Based on the detection of the one or more parts of the equipment, the method may include tagging of the first image frame with the one or more parts of the equipment detected. In an embodiment, the detection of one or more parts of the equipment and the tagging of the first image frame with the one or more parts of the equipment detected may be performed for each of the first set of image frames. The method may further include detection of one or more parts of the equipment present in a second image frame from the second set of image frames. The method further include determining a discrepancy for each of the second set of image frames. by determining a discrepancy in one more reverse steps by comparing the one more parts of the equipment present in the second image frame with the one or more parts tagged in the one more corresponding first image of the first set of image frames. The method according to the embodiment, may then provide assistance by generating at least one of a notification with respect to the discrepancy or a recommendation for correcting the discrepancy detected.

In another embodiment, a system of optimizing an assembly line is disclosed. The method may include receiving, by an optimization device, one or more process parameters corresponding to each of a plurality of process activities to be performed on the assembly line, based on which a digital assembly model is simulated on a simulation system communicably connected to the optimization device. It is to be noted that the digital assembly model may be divided into a plurality of sections and each of the plurality of sections corresponds to a part of the assembly line. The method may include testing the digital assembly model, by the optimization device on the simulation system and determining a tested working model corresponding to the inputted process information to minimize changeover time in executing the plurality of process activities. The digital assembly model changeovers from a first process activity to a second process activity from the plurality of process activities upon detection of completion of the first process activity, during continuous operation of the assembly line. The method may then proceed to the optimization device determining one or more tested process parameters based on the tested working model and may configure the assembly line based on the determined one or more tested process parameters and the tested working model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 illustrates a flowchart of a method of providing assistance during an operation performed on an equipment, in accordance with an embodiment of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims. Additional illustrative embodiments are listed.

Presently, in addition to the conventional practices, a smart assisting device can be installed in the vicinity of an ongoing operation which can track, maintain, and assist a workforce while performing the complex operations and help overcome the errors to reduce any chance of mishaps or extra expenditures arising out of the errors. The present smart assisting devices are limited in their approach to track errors, as the device may only record the steps being performed in the operation and transfer the data to the corresponding software applications, where the application may then perform the task of tracking and troubleshooting based upon the historical data or pre-defined data. The present smart assistance devices depends upon user intervention for generating results, thus, the chances of error still persists. Further, the devices may not completely follow and track every step and associated sub-steps in the operation and assist the technician. Also, the devices may only be programmed to address a limited number of machines against being universally applicable to various other operations. Therefore, the present invention provides a smart assistance device for servicing and assisting an equipment under maintenance in order to maximize efficiency and minimize operational errors in real time.

Figure 1:
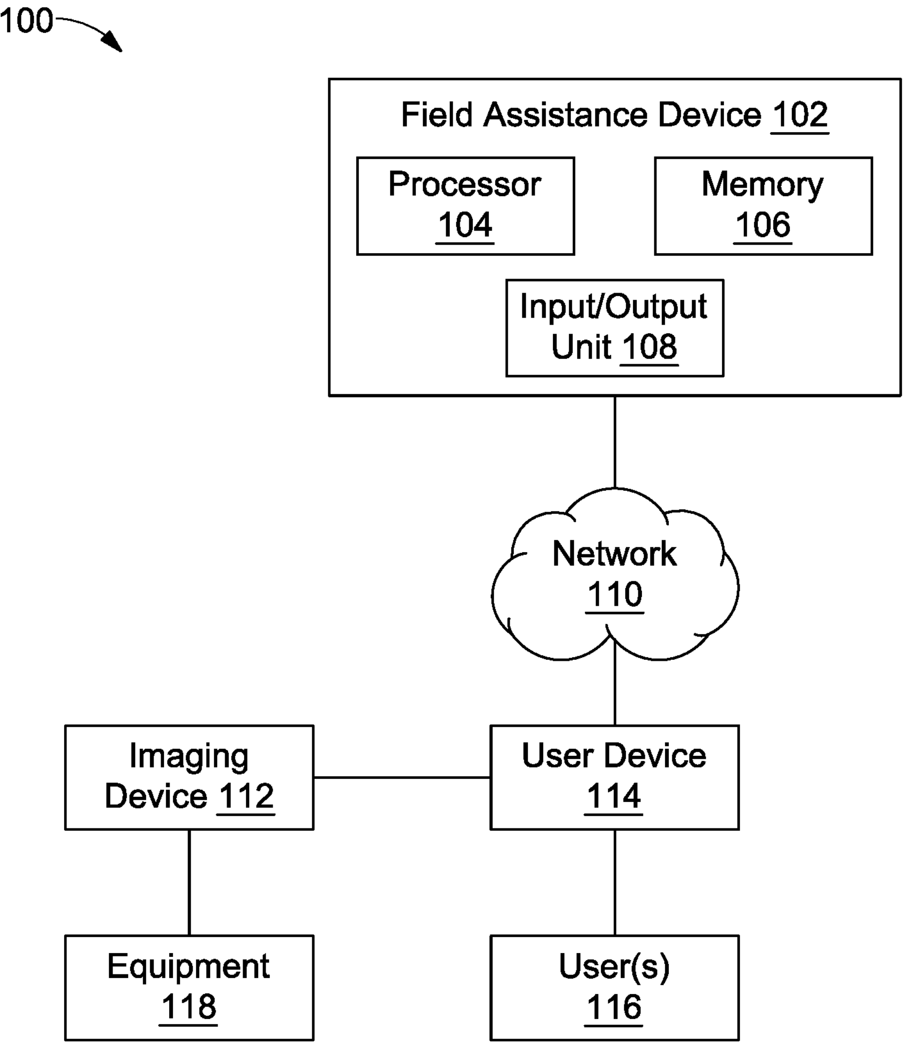
FIG. 1 illustrates a block diagram of an exemplary assistance system for providing assistance during an operation performed on an equipment, in accordance with an embodiment of the current disclosure.

FIG. 1 illustrates a block diagram indicating an exemplary assistance system 100 for providing assistance during an operation performed on an equipment, in accordance with an embodiment of the current disclosure. The assistance system 100 may include a smart assistance device 102 also interchangeably referred to as a field assistance device 102. By way of an example, the field assistance device 102 may be implemented in any computing device which may be configured or operatively connected or implemented in a server (not shown). Further, one or more users 116 may communicate with the field assistance device 102 through one or more user devices 114 through a wireless or wired communication network 110 or a combination of both. The field assistance device 102 may be communicatively coupled to an imaging device 112 and the user device 114 through the wireless or wired communication network 110 or a combination of both. In an embodiment, the imaging device 112 may be independent of the user device 114 and may be connected directly to the field assistance device 102 through the network 110.

In an embodiment, the wired or the wireless network 110 or a combination thereof can be implemented as one of the different types of networks, such as intranet, local area network (LAN), wide area network (WAN), Bluetooth, IEEE 802.11, the internet, Wi-Fi, LTE network, CDMA network, etc. Further, the wired or the wireless network can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with one another. Further the wired or the wireless network can include a variety of network devices, including routers, bridges, servers, computing devices, storage devices, etc.

In an embodiment, the user 116 may be a field operator or technician using the user device 114. In an embodiment, the user device 114 may include a variety of computing systems, including but not limited to, a laptop computer, a notebook, a portable computer, a personal digital assistant, a head-mounted device, a wearable device, a handheld or a mobile device, a touch enabled computing device, Artificial Intelligence (AI) enabled interface, a virtual reality/augmented reality/mixed reality (VR/AR/MR) enabled or integrated interface or a personal digital assistant. In an embodiment, the input/output device 108 may be configured to receive inputs from a user 116 in form of, but not limited to, touch, gaze, gesture, voice commands, etc.

The smart assistance device, also referred to as field assistance device 102 comprises one or more processors 104. The one or more processor(s) 104 may be implemented as one or more microprocessors, microcomputers, single board computer, microcontrollers, digital signal processors, central processing units, graphics processing units, logic circuitries, and/or any devices that manipulate data received from a memory 106. Among other capabilities, the one or more processor(s) 104 are configured to fetch and execute computer-readable instructions stored in a memory 106 of the smart assistance device 102. The memory 106 may store one or more computer-readable instructions or routines, which may be fetched and executed to create or share the data over a network service. The memory 106 may comprise any non-transitory storage device including, for example, volatile memory such as RAM, or non-volatile memory such as EPROM, flash memory, etc. In an embodiment, the smart assistance device 102 may be connected to a cloud server comprising the one or more processors 104 and the memory 106 in form of a cloud database.

The smart assistance device 102 may also comprise input/output devices 108. The input/output devices 108 may comprise of variety of interface(s), for example, interfaces for data input and output devices, and the like. The input/output devices 108 may facilitate inputting of instructions by a user 116 communicating with the smart assistance device 102 through a user device 114. In an embodiment, the input/output device 108 may be wirelessly connected to the smart assistance device 102 through wireless network interfaces such as Bluetooth®, infrared, or any other wireless radio communication known in the art. In an embodiment, the input/output devices 108 may be connected to a communication pathway for one or more components of the smart assistance device 102 to facilitate the transmission of inputted instructions and output the results of data generated by various components such as, but not limited to, processor(s) 104 and memory 106.

In an embodiment, the user 116 may be authenticated through the user device 114 based on input of various authentication information including, but not limited to user-name and password. In an embodiment, the user 116 may be provided access to the smart assistance device 102 based on a hierarchical user profile information such as expert operators, supervisors, junior level operators, testers, etc. In an embodiment, the smart assistance device 102 may provide recommendations to the user 116 based on the hierarchical user profile information for example, an expert operator may be provided less detailed or elaborated recommendations, wherein junior level operator may be given detailed recommendation or error notifications by the field assistance device 102.

The smart assistance device 102 may include a processor 104 and a memory 106. The memory 106 may store instructions that, when executed by the processor 104, cause the processor 104 to of providing assistance during an operation performed on an equipment 118, as discussed in greater detail below. The memory 106 may be a non-volatile memory or a volatile memory. Examples of non-volatile memory may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM). The memory 106 may also store various equipment related information such as, design manuals, operational parameters, emergency parameters, user manuals, etc.) that may be captured, processed, and/or required by the assistance system 100.

In an embodiment, the communication network 110 may be a wired or a wireless network or a combination thereof. The network 110 can be implemented as one of the different types of networks, such as ethernetIP network, intranet, local area network (LAN), wide area network (WAN), the internet, Wi-Fi, LTE network, CDMA network, and the like. Further, the network 110 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 110 can include a variety of network devices, including routers, bridges, servers, computing devices, storage devices, and the like.

In an embodiment, the imaging device 112 may include one or more imaging sensors which may capture images of an equipment 118. In an embodiment, the imaging device 112 may be positioned in a manner to align the field of view of the imaging sensors of the imaging device 112 to include an equipment 118. In an embodiment, the one or more imaging sensors may include, but not limited to, charge-coupled device (CCD), electron-multiplying charge-coupled device (EMCCD), complementary metal-oxide-semiconductor (CMOS) and/or back-illuminated CMOS.

In an embodiment, the imaging device 112 may be functional to focus on the equipment 118 undergoing a maintenance operation in a field of work, capture the images or video of the equipment 118 using the imaging sensors, and transmit the images or video to the field assistance device 102. In the embodiment, the images and video may be stored in a memory (not shown) in the imaging device 112 prior to transmission to the field assistance device 102 using the input/output device 108 or the user device 114 through communications network 110. In an embodiment, the imaging device 112 may include pan, tilt and zoom functionality in order to align the imaging sensors of the imaging device 112 to capture the equipment 118.

In an embodiment, the imaging device 112 may include depth sensors capable of capturing depth information of the foreground and the background in the images or video captured. In an embodiment, the imaging device 112 may also include thermal sensor (not shown) in order to capture thermal information of the equipment 118.

In an embodiment, the equipment 118 undergoing maintenance operation may be any physical machine equipment such as, but not limited to, home electrical appliances, computing devices, consumer electronics, automobiles, airplanes, industrial machinery, etc. In an embodiment, the equipment 118 may be human body undergoing a surgical operation, etc.

The processor 104 of the field assistance device 102 may process the images or video captured by the imaging device 112 by using one or more image processing algorithms. The processor 104 may be configured to detect an equipment 118 and one or more parts associated to the equipment 118 in each of the images frames of a video captured by the imaging device 112 during a maintenance operation being performed by the user 116 on the equipment 118.

The processor 104 may detect and tag each image frame with a time of capture of the image frame and one or more parts detected in the image frame. In an embodiment, the one or more parts may also include sub-parts, the processor 104 may be configured to detect the one or more sub-parts and tag the image frame with each sub-part detected associated to the one or more parts detected in an image frame of the equipment 118.

In an embodiment, each maintenance operation being performed on the equipment 118 may comprise of one or more forward steps and one or more reverse steps. In the one or more forward steps may include the initial steps of maintenance operation during which an equipment 118 may be disassembled. In an embodiment, the equipment may comprise of one or more parts and each one or more parts may also include one or more sub-parts which may also be disassembled during a maintenance operation. In the one or more reverse steps, the parts and sub-parts which may have been disassembled during the forward steps may be assembled again after the maintenance operation. In an embodiment, one or more parts or sub-parts may be disassembled during the forward steps in order to for them to be replaced or repaired by the user 116 to repair a fault or an error in the equipment 118. In an embodiment, the field assistance device 102 may be configured to determine if all the parts or sub-parts disassembled during repair of the fault in the equipment 118 are assembled correctly during the reverse steps. In an embodiment, the operator or user 116 may be a surgeon performing a surgery on a patient. The one or more forward steps during the surgery may include prepping the area of surgery, making an incision or a cut at a location and putting lap pads, clamps etc. for controlling bleeding, making further cuts using various other surgical tools such as, but not limited to scissors, etc. During the reverse steps, the field assistance device 102 may detect if the scissors, lap pads or clamps etc. were removed from the site of surgery. The field assistance device 102 may be configured to determine a discrepancy in the one or more reverse steps by detecting a missing part or sub-part, or a part or sub-part of different dimension, etc.

In an embodiment, the field assistance device 102 may assign a level of significance score to each step. The level of significance may range between 1% to 5%, wherein 1% level of significance may depict that a discrepancy detected in a reverse step may have a tolerance of 1% deviation from the corresponding forward step. Similarly, 5% level of significance may depict that a discrepancy in a reverse step may have a tolerance of 5% deviation from the corresponding forward step. Accordingly, a higher level of significance may depict increased tolerance and a low level of significance may depict less tolerance of discrepancy in an operation. In an embodiment, the level of significance may be dependent on the type of equipment under operation. In an exemplary embodiment, an equipment such as, for example, an airplane or a human body undergoing a maintenance operation may have a lower level of significance level as there may be very less tolerance for discrepancy during the maintenance operation. This may be due to the fact, that any discrepancy in the maintenance operation of an airplane or a human body may lead to fatal outcome. In one embodiment, each object and/or sub-object detected in an image frame may be assigned a level of significance in order to depict the tolerance level of discrepancy detected with respect to the corresponding object and/or sub-object.

The field assistance device 102 may be configured to provide assistance to the user 116 by providing a notification to the user 116 through the user device 114. The notification may be with respect to the discrepancy such as, indicating a type of discrepancy or a location of discrepancy and a recommendation for correcting the determined discrepancy.

In an embodiment, the notification may be provided to the user 116 through the user device 114 by way of a pop-up display window or a sound alert or a voice notification, or in form of an augmented visual display, etc.

Each of the image frames of the video captured during a maintenance operation by the user 116 may be tagged by the processor 104 based on if the image frame corresponds to a forward step or a reverse step of the maintenance operation. In an embodiment, the steps of forward steps and reverse steps may be tagged based on user input. In an embodiment, the user 116 may provide an indication during the maintenance operation regarding the beginning and termination of forward steps and reverse steps. Accordingly, based on user input each image frame of the operation being recorded may be tagged as a forward step or a reverse step.

In an embodiment, multiple consecutive frames of the video being captured may correspond to same forward step or reverse step and may be grouped and tagged together corresponding to a particular forward step or reverse step based on detection of similar parts and sub-parts in the group of consecutive image frames.

In an embodiment, the field assistance device 102 may display one or more notifications when a discrepancy is detected on a display screens of the user device 114. The one or more notifications may also include a recommendation for assisting the user 116 to correct the discrepancy detected. The field assistance device 102 may allow assistance and supervision of the user 116 by providing the user 116 to view relevant discrepancy information, alarms and statuses associated with the various parts and sub-parts of an equipment 118 in real time during a maintenance operation of the equipment 118. This may prevent or avoid the requirement of a supervisor of the user 116 to be physically present in order to ensure monitoring of the maintenance operation to detect any discrepancy or error caused. In an embodiment, the field assistance device 102 may be implemented in the user device 114.

Figure 2:
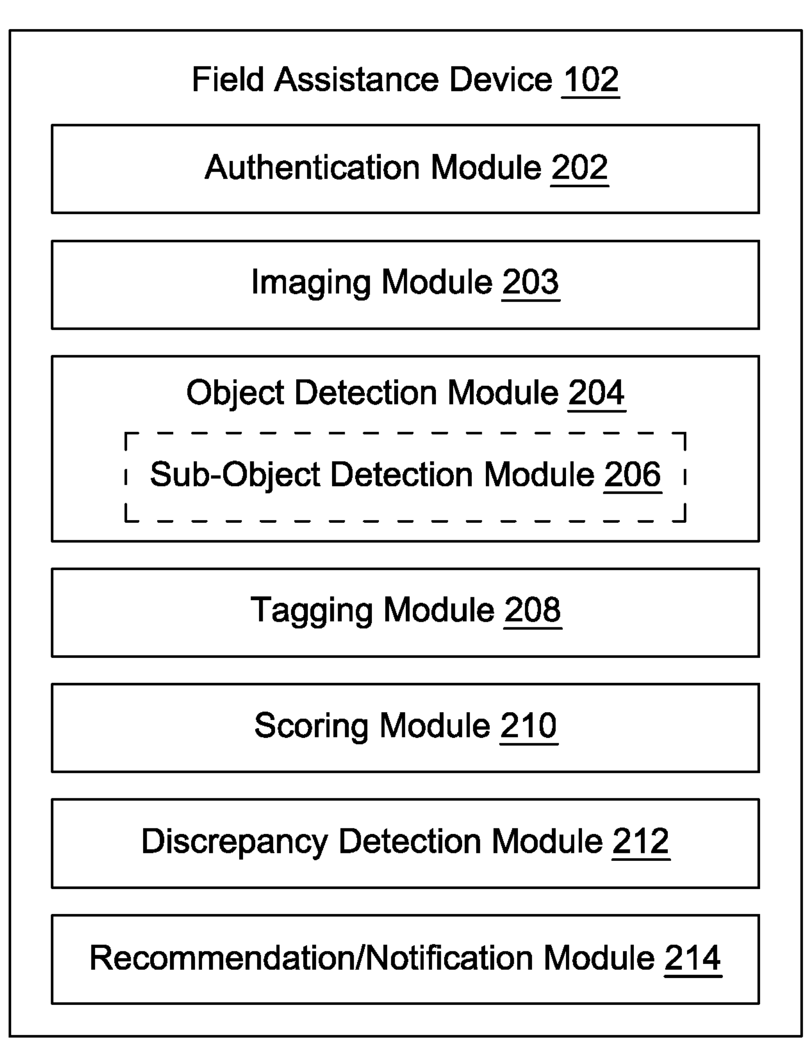
FIG. 2 illustrates a functional block diagram of the smart assistance device, in accordance with an embodiment of the present disclosure.

FIG. 2 illustrates a functional block diagram of the smart assistance device, in accordance with an embodiment of the present disclosure. Referring now to FIG. 2, a functional block diagram 200 of the smart assistance device 102 also interchangeably referred to as the field assistance device 102 is illustrated. In some embodiments, the field assistance device 102 may include an authentication module 202, an imaging module 203, an object detection module 204, a sub-object detection module 206, a tagging module 208, a scoring module 210, a discrepancy detection module 212 and a recommendation module 214.

The authentication module 202 may perform an authentication of the user 116 based on one or more authentication parameters such as a predefined user ID and a password. In an embodiment, the user 116 can register themselves directly with the field assistance system 102 using any or a combination of a mobile number, date of birth, place of birth, first name and last name, a biometric or any other such unique identifier-based input. On successful registration, the user 116 can be provided with a username and password, which can be used for providing access to the field assistance device 102 via the user device 114. Once the user 116 is authenticated by the field assistance device 102 and is provided an access to a user interface of the field assistance device 102.

The user interface of the field assistance device 102 as described in conjunction with FIG. 3, may display information related to the equipment and the detected objects and sub-objects, any discrepancy determined in the detected objects and sub-objects and recommendation to assist the user 116 to correct the discrepancy determined along with a level of significance for the discrepancy.

The imaging module 203 may be configured to enable the imaging device 112 to capture a video of a field including the equipment 118 undergoing the maintenance operation. In an embodiment, once the user 116 is authenticated by the authentication module 202, the imaging module 203 may initiate capturing the video of the equipment 118. In an embodiment, the imaging module 203 may also capture depth images of the equipment 118 in the field of view of the one or more camera sensors of the imaging device 112. In an embodiment, the imaging module 203 may display a notification on the user device 114 in case the equipment 118 is not correctly aligned with a field of view of the imaging device 112. In an embodiment, the imaging module 203 may provide guidance by way of visual directions for the user 116 to align the imaging device 112 so that the equipment 118 is in the field of view of the imaging device 112.

In an embodiment, the user device 114 may be a head-mounted device comprising the imaging device 112. The imaging module 203 may configure the head-mounted imaging device 112 to capture the equipment 118 which the user 116 may be repairing or operating upon.

The object detection module 204 may be configured to determine one or more parts of the equipment 118. The one or more parts of the equipment 118 may be detected using one or more object detection algorithms known in the art. In an embodiment, the object detection module 204 may also include the sub-object detection module 206. The sub-object detection module 206 may detect one or more sub-parts associated to the one or more parts detected by the object detection module 204. In an embodiment, the head-mounted imaging device 112 may capture the video of the maintenance process and detect the parts and/or subparts of the equipment 118 in each image frame captured. In an embodiment, the depth information, dimension, position, etc. of each of the parts and/or subparts may also be detected in each of the image frame.

In an exemplary embodiment, the equipment 118, undergoing a maintenance operation by the user 116, such as a field personnel, may be disassembled and re-assembled. In an exemplary scenario, the equipment 118 undergoing a repair operation may be a laptop. Accordingly, the user 116 may disassemble parts and/or sub-parts of the laptop such as, but not limited to, back cover, CD reader, battery, etc. which may be detected as parts of the laptop. Further, in an exemplary scenario, to remove the back cover multiple screws may be required to be unscrewed from the back cover. The screws unscrewed from the back cover may be detected as sub-parts of the detected part, i.e. back cover, of the exemplary equipment, laptop 118. Further, the parts or subparts such as, but not limited to screws, etc. detected can be of different dimensions. Therefore, there may be a scenario in which the user 116 may misplace some parts or subparts or install a part or subpart of different dimension than what was disassembled. In continuance of the above exemplary scenario, the object detection module 204 may detect that when the back cover of the laptop was removed by user 116. The sub-object detection module 206 may detect that six screws were unscrewed from the detected part i.e., back cover of the laptop during forward step of disassembling. In an embodiment, the object detection module 204 and the sub-object detection module 206 may utilize one or more object detection algorithms known in the art. In an embodiment, the object detection module 204 and sub-object detection module 206 may detect one or more objects and sub-objects in each frame by using one or more image processing algorithms known in the art.

The tagging module 208 may be configured to tag each of the imaging frame captured by the imaging module 203 based on the parts detected by the object detection module 204. In an embodiment, the tagging module 208 may tag each image frame captures with the sub-objects detected by the sub-object detection module 206. In an embodiment, each imaging frame may be tagged with a meta information of the object and/or sub-object detected in each image frame captured. In an embodiment, the meta-information of the object and/or sub-object detected may include information such as, but not limited to, and size and dimension information, position information, etc. In an embodiment, size and dimension information may include, the size and dimension of the part and/or subpart detected in each image frame. In an embodiment, the position information may include co-ordinate position of a part detected in each image frame. In an embodiment, the position information of a subpart detected in each image frame may include coordinate position of the sub-part as well as coordinate position of the subpart with respect to its corresponding part detected in each image frame.

In an embodiment, each image frame captured may be tagged as a forward step or a reverse step corresponding to a forward step based on user input. In an embodiment, the user may specify an image frame to be a reverse step of a corresponding forward step previously recorded. In an embodiment, a currently recorded image frame may be tagged as a reverse step corresponding to a previously recorded forward step based on similarity in detection of one or more objects and/or sub-objects and the corresponding meta-information. In an embodiment, each current image frame captured may be compared to each of the previously captured, processed and tagged images frames. The tagging module 208 may determine if the objects and sub-objects detected in the current image frame are same as the objects and sub-objects detected in one of the previous image frames. Based on the comparison, the tagging module 208 may tag the current frame corresponding to a reverse process based on the determination if the objects and sub-objects detected in the current frame is same with the objects and/or sub-objects detected and tagged in one of the previously captured image frames. The previous image frame detected with similar objects and/or sub-objects as the current frame may then be tagged as the corresponding forward step for the reverse step being performed in the current frame. Thus, during a maintenance operation each forward step may have a one-on-one correspondence with the one or more reverse steps.

The scoring module 210 may be configured to assign a level of significance to each of imaging frame corresponding to a forward step and a corresponding reverse step of the forward step. The level of significance may range between 1% to 5%, wherein 1% level of significance may depict that a discrepancy detected in a reverse step may have a tolerance of 1% deviation from the corresponding forward step. Similarly, 5% level of significance may depict that a discrepancy in a reverse step may have a tolerance of 5% deviation from the corresponding forward step. Accordingly, a higher level of significance score may depict increased tolerance and a low level of significance may depict less tolerance of discrepancy in an operation. In an embodiment, the level of significance score may be assigned dependent on a user history of the equipment and condition of the equipment 118 and a type of equipment 118 under maintenance. In an exemplary embodiment, an equipment such as, for example, an airplane or a human body undergoing a maintenance operation may have a lower level of significance level as there may be very less tolerance for discrepancy during their maintenance operation. This may be due to the fact, that any discrepancy in the maintenance operation of an airplane or a human body may lead to fatal outcome. In one embodiment, the scoring module 210 may assign a level of significance score in a range of 1% to 5% to each object and/or sub-object detected in an image frame in order to depict the tolerance level of discrepancy with respect to the corresponding object and/or sub-object. In the exemplary embodiment of a laptop under maintenance, the level of significance score assigned to the battery detected as a part may be 1%.

In an embodiment, the user 116 may forget to remove a temporary part installed or a tool used in disassembling the equipment. However, such discrepancy may lead to fatal errors when it comes to equipment like, for example, airplanes, trains or human body. Therefore, level of significance score assigned to such critical equipment may be 1%, as there is low tolerance of deviation in form of a discrepancy in maintenance operation of critical equipment.

The discrepancy detection module 212 may determine a discrepancy based on a comparison of the parts and/or subparts detected in a current image frame being captured in real time based on a comparison of a tagged image frame of a corresponding forward step. In an exemplary embodiment, there may be a scenario in which the user 116 maintaining the laptop may forget to replace the battery and continue to pack the laptop in its case. The discrepancy detection module 212 may determine a discrepancy during the maintenance and the notification/recommendation module 214 may provide a notification in form of an alarm or a notification. The notification may also include displaying the image frame of the forward process and highlighting the part based on which the discrepancy is determined. For example, the user 116 may be shown an image frame of a battery being removed from the laptop with battery being enclosed in a bounding box depicting the part corresponding to which the discrepancy has been determined. In an embodiment, the volume and type of notification may vary based on the level of significance score assigned to the part and/or subpart or to the forward step.

In an embodiment, the field assistance device 102 enabled in the head-mounted user device 114 may be configured by the discrepancy detection module 212 to determine one or more discrepancy in the steps performed by the user 116. In an embodiment, the discrepancy may be detected in the parts and sub-parts detected in the current image frame when compared with the parts and subparts detected in previously captured image frames. Based on the comparison a type of discrepancy and location of the discrepancy in the equipment is determined. Based on which, the notification/recommendation module 214 may display a notification as a visual digital presentation in form of augmented reality over a display screen of the head mounted user device 114.

In an embodiment, a discrepancy in the reverse steps may be determined when one or more parts is detected to be missing in the image frame of the reverse steps based on the comparison of the current image frame with the corresponding forwards image frame. In an alternate embodiment, discrepancy in a reverse steps may be determined based on a change in dimension of the detected one or more parts in the current image frame captured based on the comparison of the current image frame with the corresponding forward image frame.

One or more recommendation may be generated and displayed on the user device 114 by the notification/recommendation module 214. In an embodiment, the notification/recommendation module 214 may provide one or more recommendations in order to correct the discrepancy determined. The recommendation may be based on the user history of the equipment 118. In an embodiment, the user 116 may be provided an option to accept or reject the recommendations provided by the notification/recommendation module 214. In an embodiment, the user acceptance or rejection of the recommendations may be stored in the memory 106 of the field assistance device 102 and utilized to generate any future recommendation for the equipment 118.

Referring now to FIG. 3, a flowchart 300 illustrates a method of providing assistance during an operation performed on an equipment 118, in accordance with an embodiment of the present disclosure.

FIG. 3 is explained in conjunction with FIG. 1 and FIG. 2. Each step of the flowchart 300 may be executed by various modules, same as the modules of the field assistance device 102.

At step 302, a smart assistance device may receive a first set of image frames corresponding to one or more forward steps performed during the operation and a second set of image frames corresponding to one or more reverse steps performed during the operation from one or more imaging device 112. In an embodiment, the one or more forward steps may have a one-on-one correspondence with the one or more reverse steps.

At step 304, the smart assistance device 102 may detect one or more parts of the equipment present in a first image frame from the first set of image frames.

At step 306, the smart assistance device 102 may tag the first image frame with the one or more parts of the equipment detected in step 304.

In an embodiment, the steps 304 and step 306 may be performed for each of the first set of image frames.

At step 308, the smart assistance device 102 may detect one or more parts of the equipment 118 present in a second image frame from the second set of image frames.

At step 310, the smart assistance device 102 may determine a discrepancy for each of the second set of image frames. In an embodiment, the smart assistance device 102 may determine a discrepancy in one more reverse steps by comparing the one more parts of the equipment 118 present in the second image frame with the one or more parts tagged in the one more corresponding first image of the first set of image frames.

At step 312, the smart assistance device 102 may provide assistance by generating at least one of a notification with respect to the discrepancy or a recommendation for correcting the discrepancy.

It is intended that the disclosure and examples be considered as exemplary only, with a true scope of disclosed embodiments being indicated by the following claims.

What is claimed is:

1. A method of providing assistance during an operation performed on an equipment, the method comprising:

receiving, by an assistance device and from one or more imaging devices, a first set of image frames corresponding to one or more forward steps performed during the operation and a second set of image frames corresponding to one or more reverse steps performed during the operation, wherein the one or more forward steps has a one-on-one correspondence with the one or more reverse steps;

for each of the first set of image frames and the second set of image frames, detecting, by the assistance device, one or more sub-parts associated to the detected one or more parts present in a first image frame and a second image frame respectively;

for each of the first set of image frames, detecting, by the assistance device, one or more parts of the equipment present in the first image frame;

tagging, by the assistance device, the first image frame with the one or more parts of the equipment;

assigning, by the assistance device, a level of significance to the detected one or more parts of the equipment present in the first image frame and the detected one or more sub-parts associated to the detected one or more parts, wherein the level of significance is assigned based on historical equipment information comprising a history of maintenance and operating condition of the equipment;

for each of the second set of image frames, detecting, by the assistance device, one or more parts of the equipment present in the second image frame;

determining, by the assistance device, a discrepancy in the one or more reverse steps by comparing the one or more parts of the equipment present in the second image frame with the one or more parts tagged in one or more corresponding first image frame of the first set of image frames; and providing assistance, by the assistance device, by generating at least one of a notification with respect to the discrepancy or a recommendation for correcting the discrepancy.

2. The method as claimed in claim 1, wherein the determination of discrepancy in the one or more reverse steps comprises determining one or more sub-parts associated to the detected one or more parts missing in the second image frame based on the comparison of the second image frame with the corresponding first image frame of the first set of image frames.

3. The method as claimed in claim 1, wherein the determination of discrepancy in the one or more reverse steps comprises determining a change in dimension of the detected one or more sub-parts associated to the detected one or more parts based on the comparison of the second image frame with the corresponding first image frame of the first set of image frames.

4. The method as claimed in claim 1, further comprises:

determining, by the assistance device, for each of the first set of image frames and the second set of image frames, depth information of each of the detected one or more parts and the detected one or more sub-parts associated to the detected one or more parts in the first image frame and the second image frame respectively.

5. The method as claimed in claim 1, wherein the determination of discrepancy in the one or more reverse steps comprises determining one or more parts missing in the second image frame based on the comparison of the second image frame with the corresponding first image frame of the first set of image frames.

6. The method as claimed in claim 1, wherein the determination of discrepancy in the one or more reverse steps comprises determining a change in dimension of the detected one or more parts in the second image frame based on the comparison of the second image frame with the corresponding first image frame of the first set of image frames.

7. A system of providing assistance during an operation performed on an equipment, comprising:

an assistance device configured to:

receive, from one or more imaging devices, a first set of image frames corresponding to one or more forward steps performed during the operation and a second set of image frames corresponding to one or more reverse steps performed during the operation, wherein the one or more forward steps has a one-on-one correspondence with the one or more reverse steps;

for each of the first set of image frames and the second set of image frames, detect one or more sub-parts associated to the detected one or more parts present in a first image frame and a second image frame respectively;

for each of the first set of image frames, detect one or more parts of the equipment present in the first image frame;

tag the first image frame with the one or more parts of the equipment; and assign a level of significance to the detected one or more parts of the equipment present in the first image frame and the detected one or more sub-parts associated to the detected one or more parts, wherein the level of significance is assigned based on historical equipment information comprising a history of maintenance and operating condition of the equipment;

for each of the second set of image frames, detect one or more parts of the equipment present in the second image frame;

determine a discrepancy in the one or more reverse steps by comparing the one or more parts of the equipment present in the second image frame with the one or more parts tagged in one or more corresponding first image frame of the first set of image frames; and generate at least one of a notification with respect to the discrepancy or a recommendation for correcting the discrepancy in order to provide assistance.

8. The system of claim 7, wherein the assistance device is further configured to determine the discrepancy in the one or more reverse steps based on determination of one or more sub-parts associated to the detected one or more parts missing in the second image frame based on a comparison of the second image frame with the corresponding first image frame of the first set of image frames.

9. The system of claim 7, wherein the assistance device is further configured to determine the discrepancy in the one or more reverse steps based on determination of a change in dimension of the detected one or more sub-parts associated to the detected one or more parts based on the comparison of the second image frame with the corresponding first image frame of the first set of image frames.

10. The system of claim 7, wherein the assistance device is further configured to determine depth information of each of the detected one or more parts and the detected one or more sub-parts associated to the detected one or more parts in the first image frame and the second image frame respectively for each of the first set of image frames and the second set of image frames.

11. The system of claim 7, wherein the assistance device is further configured to determine the discrepancy in the one or more reverse steps based on determination of one or more parts missing in the second image frame based on a comparison of the second image frame with the corresponding first image frame of the first set of image frames.

12. The system of claim 7, wherein the assistance device is further configured to determine a change in dimension of the detected one or more parts in the second image frame based on a comparison of the second image frame with the corresponding first image frame of the first set of image frames.

13. A non-transitory computer-readable medium storing computer-executable instructions for providing assistance during an operation performed on an equipment, the computer-executable instructions configured for:

receiving a first set of image frames corresponding to one or more forward steps performed during the operation and a second set of image frames corresponding to one or more reverse steps performed during the operation, wherein the one or more forward steps has a one-on-one correspondence with the one or more reverse steps;

for each of the first set of image frames and the second set of image frames, detecting one or more sub-parts associated to the detected one or more parts present in a first image frame and a second image frame respectively;

for each of the first set of image frames, detecting one or more parts of the equipment present in the first image frame;

tagging the first image frame with the one or more parts of the equipment; and assigning a level of significance to the detected one or more parts of the equipment present in the first image frame and the detected one or more sub-parts associated to the detected one or more parts, wherein the level of significance is assigned based on historical equipment information comprising a history of maintenance and operating condition of the equipment;

for each of the second set of image frames, detecting one or more parts of the equipment present in the second image frame;

determining a discrepancy in the one or more reverse steps by comparing the one or more parts of the equipment present in the second image frame with the one or more parts tagged in one or more corresponding first image frame of the first set of image frames; and providing assistance by generating at least one of a notification with respect to the discrepancy or a recommendation for correcting the discrepancy.

14. The non-transitory computer-readable medium of claim 13, wherein the determination of discrepancy in the one or more reverse steps comprises determining one or more sub-parts associated to the detected one or more parts missing in the second image frame based on a comparison of the second image frame with the corresponding first image frame of the first set of image frames.

15. The non-transitory computer-readable medium of claim 13, wherein the determination of discrepancy in the one or more reverse steps comprises determining a change in dimension of the detected one or more sub-parts associated to the detected one or more parts based on the comparison of the second image frame with the corresponding first image frame of the first set of image frames.

* * * * *